United States Patent
Warfield, III

Patent Number: 5,694,752
Date of Patent: Dec. 9, 1997

[54] UTILITY EXPANSION SYSTEM FOR A GROUND VEHICLE

[76] Inventor: Edwin Warfield, III, 16185 Ed Warfield Rd., Woodbine, Md. 21797

[21] Appl. No.: 571,410

[22] Filed: Dec. 13, 1995

[51] Int. Cl.$^6$ .............................. A01D 34/66; A01D 34/82
[52] U.S. Cl. .............................. 56/13.6; 56/12.1; 56/12.7; 56/16.9; 56/DIG. 9
[58] Field of Search .............................. 56/13.6, 13.7, 56/13.8, 12.1, 12.7, 16.9, DIG. 9

[56] References Cited

U.S. PATENT DOCUMENTS

| | | | |
|---|---|---|---|
| 3,812,917 | 5/1974 | Strate | 172/15 |
| 4,063,748 | 12/1977 | Schmidt | 56/6 X |
| 4,629,006 | 12/1986 | Mullet et al. | 172/15 |
| 4,663,920 | 5/1987 | Skovhoj | 56/12.7 |
| 4,691,784 | 9/1987 | Mullet et al. | 172/15 |
| 4,741,148 | 5/1988 | Ekas, Sr. et al. | 56/12.9 |
| 4,869,056 | 9/1989 | Lynch | 56/15.2 |
| 5,119,619 | 6/1992 | Zappia | 56/12.8 |
| 5,303,532 | 4/1994 | Phillips | 56/13.8 X |
| 5,561,969 | 10/1996 | Sandy | 56/13.6 |

*Primary Examiner*—Terry Lee Melius
*Attorney, Agent, or Firm*—Morton J. Rosenberg; David L. Klein

[57] ABSTRACT

A utility expansion system (100) to be retrofitted onto a ground vehicle (10) is provided. The utility expansion system (100) expands the range of ground working functions that may be performed with the aid of the given ground vehicle (10) by enabling various ground working equipment (20) to be operably coupled to the ground vehicle (10) for concurrent operation therewith. The utility expansion system (100) includes a deck member (110) mounted to the ground vehicle (10), an apparatus support member (120) coupled to the deck member (110) for pivotally supporting a given ground working apparatus (20) in spaced relation to the ground vehicle (10), apparatus securing mechanism (200) coupled to the ground working apparatus (20) and to the apparatus support member (120) to secure the ground working apparatus (20) to the apparatus support member (120), and apparatus manipulation mechanism (130) coupled to the ground working apparatus (20) by which a user may manipulate that ground working apparatus (20) while he or she is operating the ground vehicle (10). In one embodiment, the deck member (110) is hingedly mounted to the ground vehicle (10) and supported at its outer end by a deck member support mechanism, the two features enabling the deck member (110) to be inclined relative to the ground vehicle (10) responsive to any irregularity in the ground contour, so as to realize optimal ground tracking. A ground working apparatus (20) such as a portable line-fed power weed trimmer or a heavier duty walk-behind power weed trimmer may thus be operably coupled to the ground vehicle (10).

21 Claims, 6 Drawing Sheets

UTILITY EXPANSION SYSTEM FOR A GROUND VEHICLE

BACKGROUND OF THE INVENTION

1. Field of the Invention

The subject utility expansion system is directed to a system for expanding the range of ground working functions that may be performed with the aid of a ground vehicle. More specifically, the subject utility expansion system is a retrofit system for powered ground working vehicles such as riding lawn mowers or tractors. The subject utility expansion system enables various ground working equipment such as portable line-fed weed trimmers and heavier duty walk-behind weed trimmers to be operably coupled to a ground working vehicle for simultaneous operation thereof by a user during his or her operation of the vehicle.

For the owner or caretaker of sizable real property, maintaining the natural grounds of that property requires a substantial investment of time, labor and expense. Apart from cutting grass, other necessary tasks such as weed trimming and leaf or clippings blowing typically require of the owner or caretaker extensive and exhaustive efforts. Fortunately, the owner or caretaker is aided in his or her grounds maintenance endeavors, at least in grass cutting, by the availability of riding lawn mowers or tractors. In other areas of grounds maintenance, however, no such effective aid is available. While a plethora of automatic equipment such as portable line-fed weed trimmers, walk-behind weed trimmers, and portable or walk-behind blowers are available, utilization of such automatic equipment nevertheless requires of the user great physical exertion where the grounds being worked is expansive; for he or she must either hand-carry, or else, push or pull the given apparatus about the grounds. Although such automatic equipment may be available in vehicular form, being designed specifically to perform a particular task; such specialized vehicular equipment, even if available, would likely be far too costly to acquire and maintain to be a realistic option for most owners or caretakers of sizable grounds.

What is needed is a system that may be retrofitted to existing riding lawn mowers or tractors of various types which enables the removable operational coupling thereto of a wide range of various ground working apparatus types. Such a system, as a retrofit system, would be a financially accessible option for many in need of such a system, as it would enable a user to simply make, at relatively little additional expense, fuller use of a substantial investment he or she has likely already made in a riding lawn mower or tractor. The system would enable the user to perform a variety of necessary ground working tasks while conveniently operating the riding lawnmower or tractor, thus enabling him or her to accomplish those tasks with both greater speed and less physical exertion.

2. Prior Art

Utility attachments for riding lawn mowers or tractors are known. The closest prior art known includes U.S. Pat. Nos. 3,812,917, 4,741,148, 4,691,784, 4,629,006, and, 5,119,619.

None of the systems disclosed in this prior art provides for the structure or the operational flexibility provided by the subject utility expansion system for a ground vehicle. For instance, U.S. Pat. No. 4,629,006 is directed to a lawn edger attachment for tractors consisting of an angle bar base member adapted to be mounted to the side of a tractor and a boom member pivotally coupled to the base member to angle laterally outward, a vertical circular blade being mounted at the outer end of the boom member. The boom member is provided on its upper end with a T-handle to allow the operator of the given tractor to control the edging blade by manipulating the boom member. Both the base member and the boom member which define this system are specifically designed for one particular lawn edging mechanism. They do not enable the operable coupling to a tractor various types of ground working equipment, as is the subject utility expansion system for a ground vehicle. Neither the base member nor the boom member may be adapted to operably couple anything to a given tractor other than a vertically oriented edging blade without wholesale modification and reconfiguration of both members.

U.S. Pat. No. 4,741,148 is directed to a tractor attached leaf or clipping blower/vacuum device. Briefly, the device is a wheeled vacuum assembly designed to be hitched to the rear of a tractor and pulled along thereby. The device is specifically configured for blower/vacuum operation, and no means for its ready reconfiguration to realize a different type of ground working device is provided. Moreover, no means for manipulation of the vacuum device by the operator of the given tractor is provided. Hence, the structural and functional features which enable the interchangeable operable coupling of various types of ground working equipment to a ground vehicle embodied in the subject utility expansion system for a ground vehicle are not seen in this device.

SUMMARY OF THE INVENTION

The subject utility expansion system enables the operable coupling of various types of ground working equipment to a user-operated ground vehicle. The subject utility expansion system includes a deck member mounted to a ground vehicle which extends from the ground vehicle substantially along a lateral plane and which serves as the base support for ground working equipment of various types and configurations. The subject utility expansion system also includes an apparatus support member coupled to the deck member for pivotally supporting a given ground working apparatus in spaced relation to the ground vehicle; apparatus securing means coupled to the ground working apparatus and to the apparatus support member so as to couple the ground working apparatus to the apparatus support member; and, apparatus manipulation means coupled to the given ground working apparatus by which a user may manipulate that ground working apparatus while he or she is operating the ground vehicle.

In the preferred embodiment of the subject utility expansion system, the deck member is hingedly coupled to the ground vehicle so that it may adjust vertically to the irregular contour of that portion of the ground being worked on. To that end, the deck member also includes in the preferred embodiment a deck member support means in the form of a wheel coupled to a peripheral portion of the deck member for normally maintaining contact with the ground.

The subject utility expansion system further includes in the preferred embodiment support mounting means coupled to the top surface of the deck member for telescopically receiving therein a portion of the apparatus support member. The apparatus support member includes a longitudinal base section telescopically received within the support mounting means and an extension section laterally extending from the top portion of the base section.

In one application of the preferred embodiment, a portable power weed trimmer is operably suspended from the extension section by securely coupling the weed trimmer's elongate shaft portion thereto via the apparatus securing means. The apparatus manipulation means is coupled to the weed trimmer via the apparatus securing means and includes actuation means in the form of an actuation lever pivotally coupled to a grip member and connected by metallic cable to the weed trimmer's throttle assembly.

In an alternate embodiment, the subject utility expansion system includes at least a pair of apparatus support members, each of which is releasably secured to the deck member and extends substantially along the lateral plane defined by the deck member. The system also includes a lateral retention cable which engages a pulley mounted on one of the apparatus support members and which has first and second end portions coupled respectively to the apparatus securing means and the ground vehicle.

In one application of this alternate embodiment of the subject utility expansion system, a walk-behind power weed trimmer is secured by the apparatus securing means to the apparatus support members for operation concurrent with the ground vehicle's operation. The apparatus support members afford limited pivotal movement about the lateral plane relative to the ground vehicle during concurrent operation. Control of this pivotal movement is provided by the lateral retention cable which limits such pivotal movement, at least in one direction, and a handle member securely coupled to the weed trimmer's handle assembly for manipulation by the user during operation.

DESCRIPTION OF THE PREFERRED EMBODIMENTS

Figure 1:
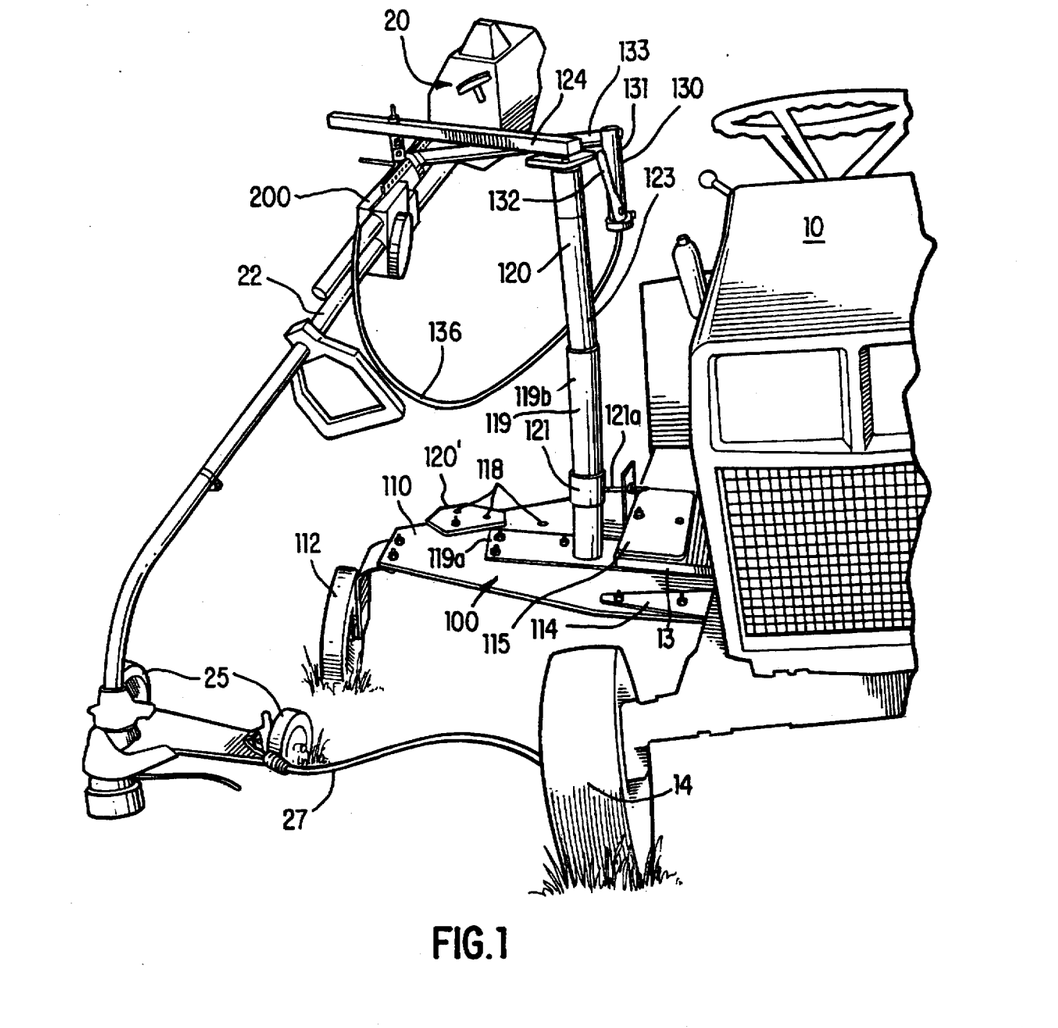
FIG. 1 is a perspective view of the preferred embodiment of the subject utility expansion system, illustrating one application thereof.
Figure 2:
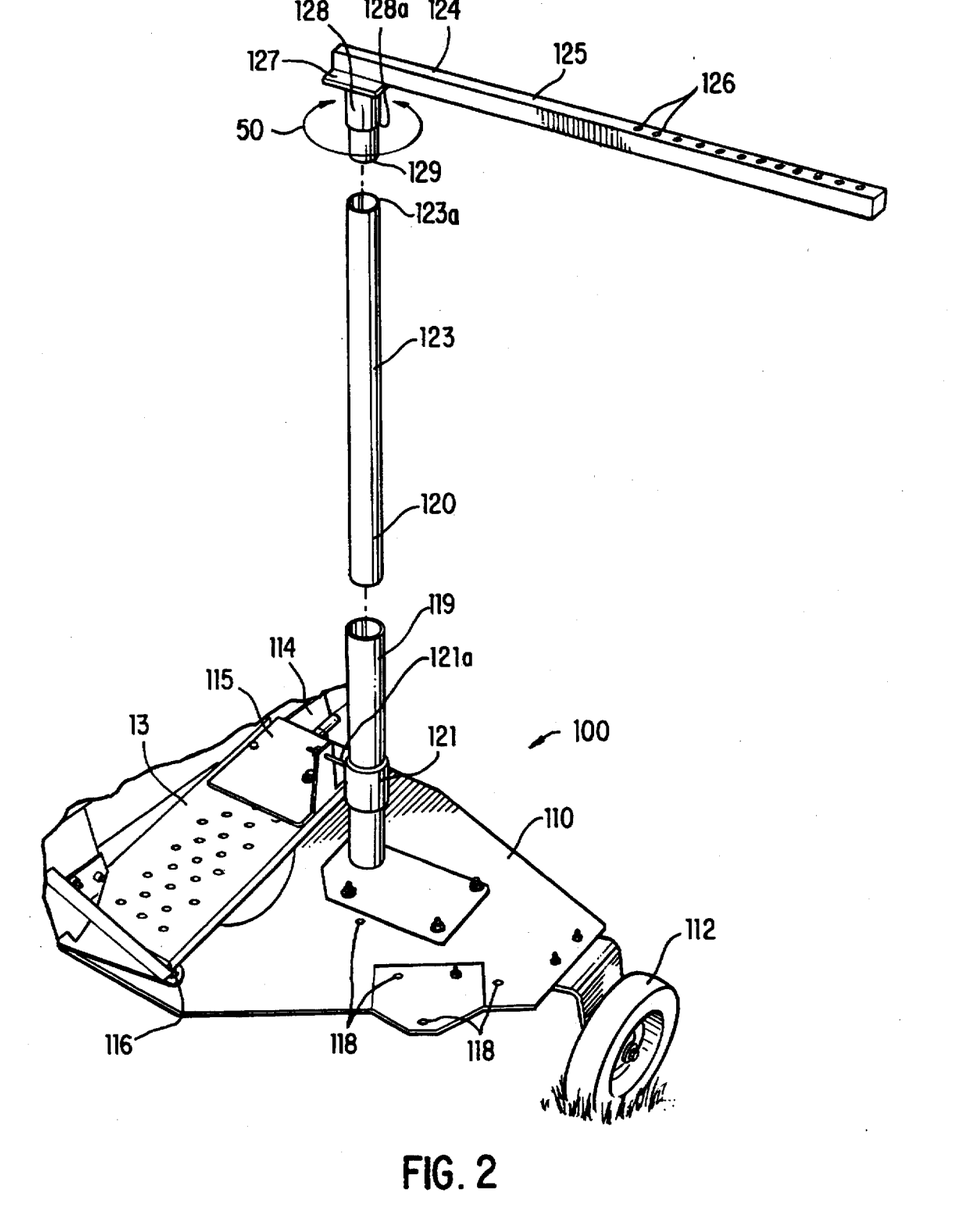
FIG. 2 is a partially-exploded perspective view of a portion of the preferred embodiment of the subject utility expansion system.

Referring now to FIG. 1 and FIG. 2, there is shown one application of the preferred embodiment of utility expansion system 100 retrofitted to a ground vehicle 10. Utility expansion system 100 comprises a deck member 110, apparatus support member 120, apparatus securing mechanism 200, and apparatus manipulation mechanism 130. Deck member 110 is preferably a unitary planar member composed of steel or other material not important to the inventive concept with the exception that it be formed of a composition having sufficient strength to structurally accept the loads imparted thereon. When a steel composition is employed, a thickness of 0.125 inch is preferable, although other thicknesses may be employed depending on the type and available horsepower of the particular ground vehicle 10 employed, or depending on the harshness of the intended application environment. Deck member 110 is mounted to ground vehicle 10 via forward and aft brackets 114, 116 and suitable fastening mechanisms—for example, a plurality of nut and bolt couplings—such that it extends substantially along a lateral plane outwardly from one side of ground vehicle 10.

While forward and aft brackets 114, 116 may be formed as rigid, unitary members which maintain deck member 110 in fixed relation to ground vehicle 10, they are hinged in the preferred embodiment to allow for the vertical, or longitudinal, ground-tracking movement of deck member 110 thereabout. At a peripheral portion of deck member 110, distal from its coupling with ground vehicle 10, there is affixed by suitable fastening mechanism a deck member support mechanism 112 which, in the preferred embodiment, is a wheel of sufficient diameter to maintain deck member 112 substantially parallel to the horizontal, or lateral, plane when the system is operating on level ground. Where the ground being worked is not level, the hinged coupling of deck member 110 provided by hinged forward and aft brackets 114, 116 enable the inclining of deck member 110 to insure that the ground working mechanism of apparatus 20 effectively follows the ground's irregular contour.

Deck member 110 may have any peripheral contour that does not interfere with the operation of either ground vehicle 10 or ground working apparatus 20. In the preferred embodiment, however, deck member 110 is peripherally contoured to be sufficiently wide at its inner portion proximal to ground vehicle 10 and to taper inward toward its outer portion distal from ground vehicle 10. This peripheral contour offers sufficient surface area adjacent ground vehicle 10 to enable strong and stable coupling to ground vehicle 10 while minimizing the overall weight of deck member 110 and reducing the risk of mechanical encroachment upon space necessary for movement and operation of ground working apparatus 20.

Deck member 110 has formed therein a plurality of anchoring openings 118 by which apparatus support member 120 and a supplemental apparatus support extension member 120' of various configurations may be fastened to the top surface of deck member 110. Anchoring openings 118 are preferably through holes with which corresponding through holes in apparatus support member 120 and supplemental apparatus support extension member 120' align for fastening purposes.

A support mounting mechanism 119 is affixed to the top surface of deck member 110 via a flange portion 119a using a suitable fastening mechanism passed through openings 118 of deck member 110 and corresponding through holes in flange portion 119a. Extending substantially normally from flange portion 119a is an elongate tubular portion 119b within which a portion of apparatus support member 120 is telescopically received and thereby supported. Both the flange and tubular portions 119a, 119b of support mounting mechanism 119 are preferably composed of steel or other material having comparable strength and rigidity and may be welded together at their coupling points, such that support mounting mechanism 119 provides sufficiently stable and rigid support for apparatus support member 120.

In the preferred embodiment, the stability of tubular portion 119b is reinforced by coaxially capturing tubular portion 119b within an annular stabilization member 121 affixed via stabilization bolt 121a to a flange of stabilization bracket 115. Stabilization bracket 115 is fixedly mounted to a rigid body portion of ground vehicle 10 such as a foot rest portion 13. Stabilization bolt 121a is adjustably secured to stabilization bracket 115 by tightening a stabilization nut mated thereto.

Apparatus support member 120 includes an elongate tubular base section 123 having a bottom portion telescopically received within and supported by tubular portion 119b of support mounting means 119 and an upper circumferential end surface 123a. Apparatus support member 120 also includes an extension section 124 pivotally coupled to the top portion of base section 123.

Extension section 124 includes, as shown in FIG. 2, an elongate apparatus support arm 125 having a plurality of mounting openings 126 formed therethrough. An end section of apparatus support arm 125 is fixedly secured by welding, or other such means, to a planar shoulder portion 127. Below shoulder portion 127 extends a cylindrical stop portion 128 having an outer diameter substantially equal to or greater than the outer diameter of base section 123. Stop portion 128 has a lower circumferential end surface 128a for abutting upper circumferential end surface 123a of base section 123. Extending coaxially from stop portion 128 is a cylindrical leg portion 129 of sufficiently small outer diameter to be coaxially received and rotatably actuable within base section 123. The axial extent of cylindrical leg portion 129 is sufficiently great that once it is received within base section 123, and lower circumferential end surface 128a of stop portion 128 comes to rest upon upper circumferential end surface 123a of base section 123, a secure pivotal coupling of extension section 124 to base section 123 is realized. This pivotal coupling allows the lateral pivoted rotation of apparatus support arm 125, as illustrated by directional arrow 50.

While cylindrical stop portion 128 may be integrally formed with shoulder portion 127, stop portion 128 is formed in the preferred embodiment as a separable unit having a stop portion flange 128'. Stop portion 128 is then affixed to shoulder portion 127 by securing flange 128' to shoulder portion 127 using a suitable fastening mechanism, as shown in FIG. 4.

Figure 3:
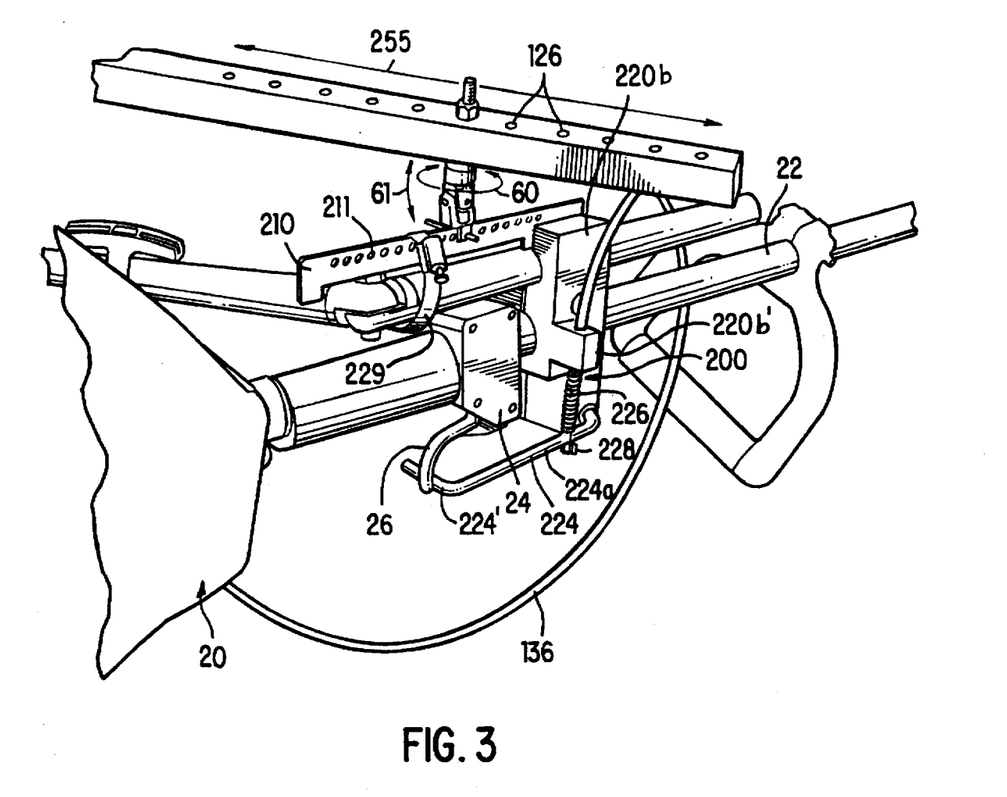
FIG. 3 is a perspective view, partially cut-away, of portions of the preferred embodiment of the subject utility expansion system, in one application.
Figure 4:
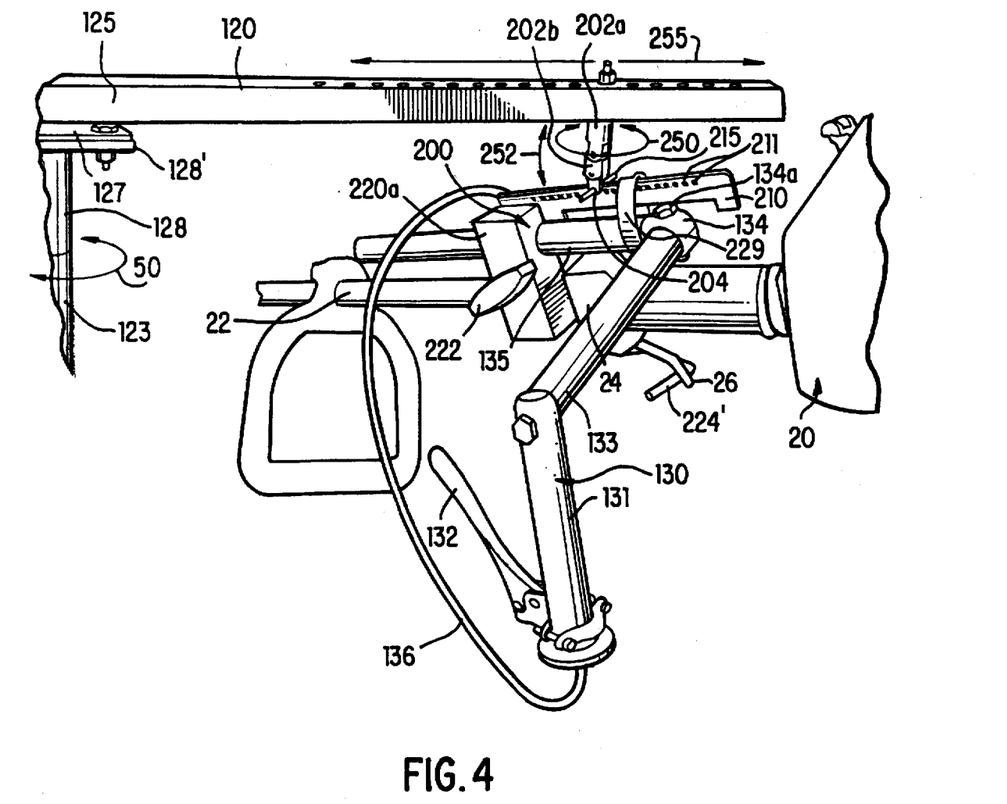
FIG. 4 is a perspective view, of the portion of the preferred embodiment of the subject utility expansion system shown in FIG. 3, from a reverse viewing angle.

In the application shown for the preferred embodiment of utility expansion system 100, ground working apparatus 20 is a standard, commercially-available portable power weed trimmer having a shaft portion 22, a throttle assembly 24 (FIGS. 3 and 4), and a trigger 26 (FIGS. 3 and 4). Referring to FIGS. 3 and 4, ground working apparatus 20 is operably coupled to apparatus support member 120 by apparatus securing mechanism 200. Apparatus securing mechanism 200 includes first and second securing bracket members 220a, 220b joined together by a knobbed securing bolt 222. Securing bracket members 220a, 220b are preferably composed of a machined block of metal or other material of comparable strength and rigidity and have formed therethrough threaded openings sufficient to securely engage knobbed securing bolt 222. Second securing bracket member 220b has formed thereon a protruding portion 220b' having a through opening for support and retention of a cable 136 passed therethrough. When tightly joined, first and second securing bracket members 220a, 220b capture therebetween a segment of the ground working apparatus shaft portion 22, a grip support arm coupling rod 135, and a suspension bar 210.

Suspension bar 210 which is composed of a material, such as steel, of sufficiently high strength and rigidity to afford the formation of a plurality of adjustment openings 211 therethrough without the consequential compromise of structural integrity, is pivotally suspended from apparatus support arm 125 of apparatus support member 120 via pivotally coupled first and second suspension links 202a, 202b. With the first suspension link 202a coupled to a mounting opening 126 of apparatus support arm 125 via a nut and bolt coupling or other suitable fastening mechanism, suspension arm 210 is secured below apparatus support arm 125 by passing a coupling pin 215 through one or more through openings 204 formed on second suspension link 202b and through one adjustment opening 211. This coupling configuration is such that it enables suspension bar 210 to undergo pivotal movement in both horizontal and vertical planes as illustrated by directional arrows 250 and 252 shown in FIG. 4.

By its capture between first and second securing bracket members 220a, 220b, ground working apparatus 20 is securely coupled in fixed relation to suspension bar 210. This coupling is reinforced by coupling reinforcement member 229 securing grip support arm coupling rod 135, which is also captured between first and second securing bracket members 220a, 220b, with suspension bar 210. Coupling reinforcement member 229 may be an adjustable metallic band, or other suitable securing mechanism.

Ground working apparatus 20 is thus suspended from apparatus support arm 125 in highly manipulable, though secure manner. Repositioning or balancing adjustments, if necessary, may be made for ground working apparatus 20 in one or both of two ways. The first adjustment may be made by decoupling first suspension link 202a from a given mounting opening 126, moving the suspended assembly along a direction parallel to directional arrow 255, and re-coupling first suspension link 202a to apparatus support arm 125 via a different mounting opening 126. This means for translational adjustment of the suspended assembly enables the lateral spacing between ground working apparatus 20 and ground vehicle 10 to be widely varied. A second adjustment may be made by removing coupling pin 215, repositioning suspension bar 210 and the assembly coupled thereto with respect to second suspension link 202b, then replacing coupling pin 215 through a through hole 204 of second suspension link 202b and a different adjustment opening 211. This means for adjustment enables a user to vary the balancing of ground working apparatus 20 about the shaft of coupling pin 215 to suit his or her personal preferences. It may also become necessary to employ such adjustment means where the elevational contour of the ground to be worked is sufficiently irregular to necessitate a front-heavy, unbalanced coupling to compensate for the upward thrust to which the ground working mechanism on the front end of ground working apparatus 20 may periodically be subjected.

Apparatus manipulation mechanism 130 is securely coupled in fixed relation to ground working apparatus 20 by its capture between first and second securing bracket members 220a, 220b of apparatus securing mechanism 200. Apparatus manipulation mechanism 130 is formed by a grip member 131 transversely coupled to a grip support arm 133 which, in turn, is transversely coupled to a grip support arm coupling rod 135 through an angle-adjustable elbow joint 134. The capture of grip support arm coupling rod 135 between first and second securing bracket members 220a, 220b and the securing thereof with suspension bar 210 by coupling reinforcement member 229 enables a user, by imparting the necessary force on grip member 131, to initiate or oppose reorienting movements of ground working apparatus 20 in a direction defined by directional arrows 250 and 252.

The position of grip member 131 may be adjusted to both suit a particular user by loosening knobbed securing bolt 222, axially sliding grip support arm coupling rod 135 with respect to first and second securing brackets 220a, 220b and coupling reinforcement member 229, then re-tightening knobbed securing bolt 222. The position of grip member 131 may also be adjusted by loosening an elbow joint fastening means 134a, manipulating the angle between grip support arm 133 and grip support arm coupling rod 135, then re-tightening fastening means 134a.

Apparatus manipulation mechanism 130 includes an apparatus actuation lever 132 mechanically connected by cable 136 and a trigger lever 224 to trigger 26 on throttle assembly 24 of ground working apparatus 20. The end of cable 136 opposite that end coupled to apparatus actuation lever 132 is adjustably fastened by end fastener 228 to a shaft portion 224a of triggering lever 224. Triggering lever 224, which is pivotally mounted to second securing bracket member 220b, includes at its free end a foot portion 224' which extends transversely from its shaft portion 224a. Foot portion 224' maintains contact with trigger 26.

In both structure and function, apparatus actuation lever 132, cable 136, and their coupling to triggering lever 224 are quite similar to brake lever assemblies found on bicycles. Accordingly, cable 136 is preferably a metallic cable of sufficient strength and overall thickness to adequately transfer translational forces axially imparted thereon. The metallic cable is preferably sheathed within a tubular covering composed of material, such as plastic or vinyl, possessing sufficient material strength to prevent excessive bending of the metallic cable sheath therein while protecting it from the surrounding environment. When a user squeezes the free end of apparatus actuating lever 132 towards grip member 131, an axial pulling force is imparted on cable 136. This force is then transferred by cable 136 to the shaft portion of triggering lever 224 to cause its responsive pivotal movement upward. This upward pivotal movement causes foot portion 224' of triggering lever 224 to apply an upward force on trigger 26 on throttle assembly 24 so as to actuate the operation of ground working apparatus 20.

Apparatus actuation lever 132 is mechanically biased to its unsqueezed, or non-actuating, position by coil spring 226 coaxially enveloping that portion of cable 136 extending between protruding portion 220b' of second securing bracket 220b and the shaft portion of triggering lever 224. Coil spring 226 is thus captured to apply a biasing spring force downward against triggering lever 224. The spring-biased position of triggering lever 224 may be adjusted by appropriately advancing or retracting cable 136 relative to end fastener 228.

Referring back to FIG. 1, it should be noted that while not necessary to the practice of the subject invention, it is preferable to make minor modifications to ground working apparatus 20 to facilitate its concurrent operation with ground vehicle 10. If not already equipped, the ground working mechanism of ground working apparatus 20 is equipped with a pair of guide wheels 25 to enhance operational stability and thereby promote consistency of the work performed by ground working apparatus 20. In addition, a cable 27 is coupled between the ground working mechanism assembly of ground working apparatus 20 and the hub of front wheel 14 of ground vehicle 10 using suitable fastening mechanism. Cable 27 serves as a means for lateral retention of the ground working apparatus 20 and, as such, enhances the stability and controllability of ground working apparatus 20.

Figure 5:
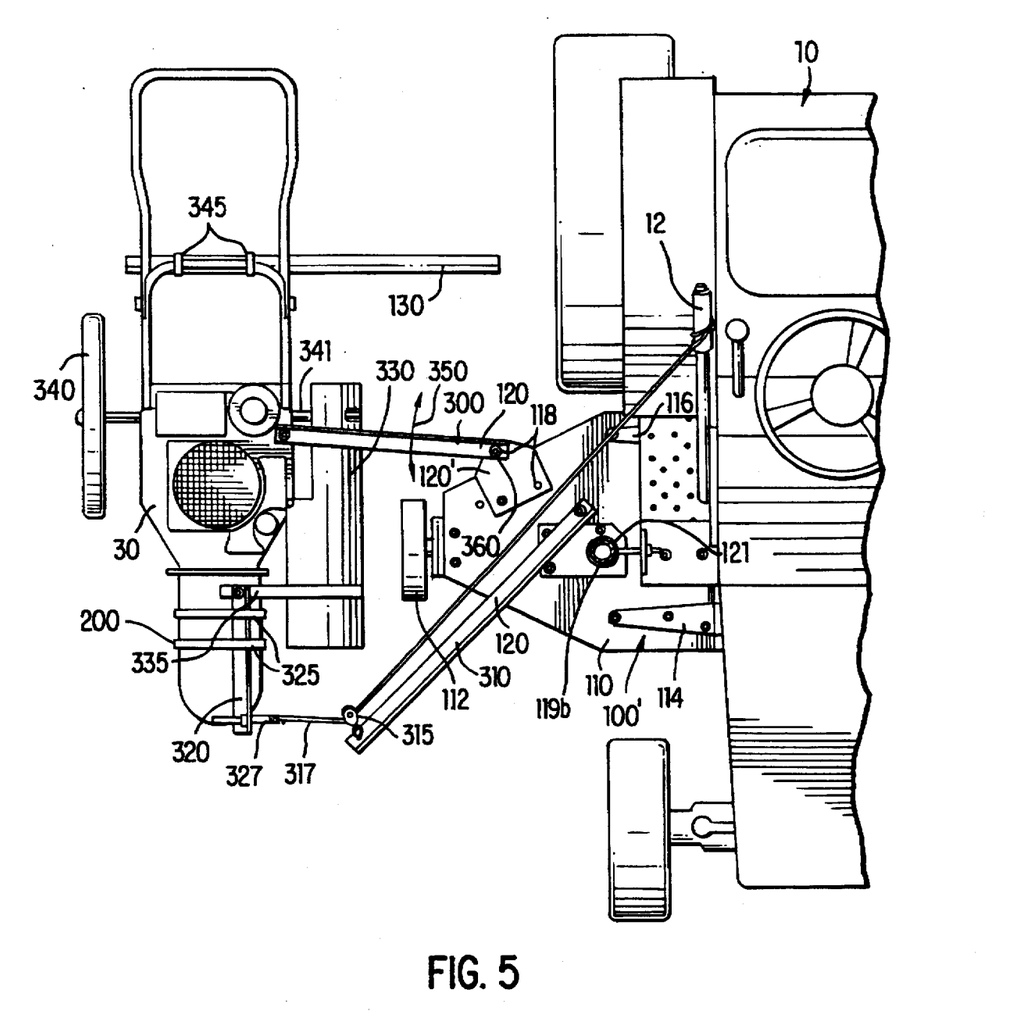
FIG. 5 is a plan view of an alternate embodiment of the subject utility expansion system, in one application; and, FIG. 6 is a perspective view of a portion of the alternate embodiment of the subject utility expansion system shown in FIG. 5.

Referring now to FIG. 5, there is shown one application of an alternate embodiment of the subject utility expansion system 100'. Element designation numerals employed in FIGS. 1–4 designate the same elements. In this embodiment, utility expansion system 100' includes at least a pair of apparatus support members 120, 120 so as to accommodate, generally, a wheeled, walk-behind type ground working apparatus 30. Apparatus support members 120, 120 are formed, more specifically, by a spacing bar 300 and a cable guide bar 310. Both bars 300, 310 are preferably formed of steel or other material of comparable strength and rigidity, and possess an angled, or substantially L-shaped, cross-section for strength reinforcement. Spacing bar 300 is fixedly coupled at one end by suitable fastening means to ground working apparatus 30 and is pivotally coupled at the other end by suitable fastening means to an anchoring point 118 of supplemental apparatus support extension member 120'. The pivotal coupling of spacing bar 300 to supplemental apparatus support extension member 120' enables the re-orientation of ground working apparatus 30 along the direction indicated by directional arrows 350. Cable guide bar 310 is fixedly coupled by a suitable fastening mechanism to an anchoring opening 118 of deck member 110 and extends outwardly therefrom, the other end of cable guide bar 310 being suspended as shown. Cable guide bar 310 has mounted adjacent its other end a cable pivoting member 315, preferably realized in the form of a pulley.

One end of a lateral retention cable is secured to a secure part of ground vehicle 10, such as brake lever 12, which remains stationary in its locked position during operation of ground vehicle 10. Lateral retention cable 317 is then routed through cable pivoting member 315, and its other end is secured to apparatus securing mechanism 200 coupled to ground working apparatus 30. Thus secured, lateral retention cable 317 serves to limit the orientation of ground working apparatus 30 away from the direction of travel of ground vehicle 10. This enables a user to retain sufficient directional control of ground working apparatus 30 during its operation by use only of apparatus manipulation mechanism 130, which is, in this embodiment, simply an elongate bar fixedly coupled to the handle portion of ground working apparatus 30 by handle attachment means 345 and which extends laterally from ground working apparatus 30 toward a user seated on ground vehicle 10.

In the application shown for this alternate embodiment, walk-behind ground working apparatus 30 is normally a conventional, commercially available, heavy duty weed trimming machine having a wheeled motor deck. While they may be unnecessary for other machine types, or even for other configurations of the given machine 30, the following modifications are preferable for the given machine 30, the trademarked DR Trimmer/Mower manufactured by Country Home Products, Inc. First, the inner main wheel (relative to the laterally-disposed ground vehicle 10) is removed to leave only the outer main wheel 340 coupled to machine 30; and, a debris guard 330 is fixedly attached to the body of machine 30 to serve the dual function of protecting the user from flying debris and supporting that portion of the wheel axle 341 left suspended by the inner main wheel's removal. The attachment of debris guard 330 to machine 30 is reinforced by coupling it via guard attachment 335 to apparatus securing mechanism 200.

Apparatus securing mechanism 200 includes a cable connection bar 320, cable connection bar attachment mechanism 325, and suitable fastening mechanisms associated with each. Cable connection bar 320 is composed of steel or other material of comparable strength and rigidity and has an angled, or L-shaped, cross-section. Cable connection bar 320 is fixedly coupled adjacent one end or by a suitable fastening mechanism to guard attachment 335. Cable connection bar 320 is secured to machine 30 by cable connection bar attachment 325 which, like guard attachment 335, may simply be flexible steel bands appropriately tightened about a body portion of machine 30. An eye bolt 327 is fastened by a nut coupling therewith to a portion of cable connection bar 320 adjacent its free end. Eye bolt 327 then serves as a securing point for lateral retention cable 317, where no other suitable securing point or securing means is otherwise available on machine 30.

In the alternate embodiment shown, deck member 110' is hingedly coupled to ground vehicle 10 via hinged forward and aft brackets 114, 116. This enables deck member 110 to be inclined as necessary to accommodate the elevational contour of the ground travelled by the wheel of deck member support mechanism 112. The elevation of the ground travelled by the outer main wheel 340 of machine 30, however, may not at all times be even with the elevation of the ground travelled by the wheel of deck member support mechanism 112.

Figure 6:
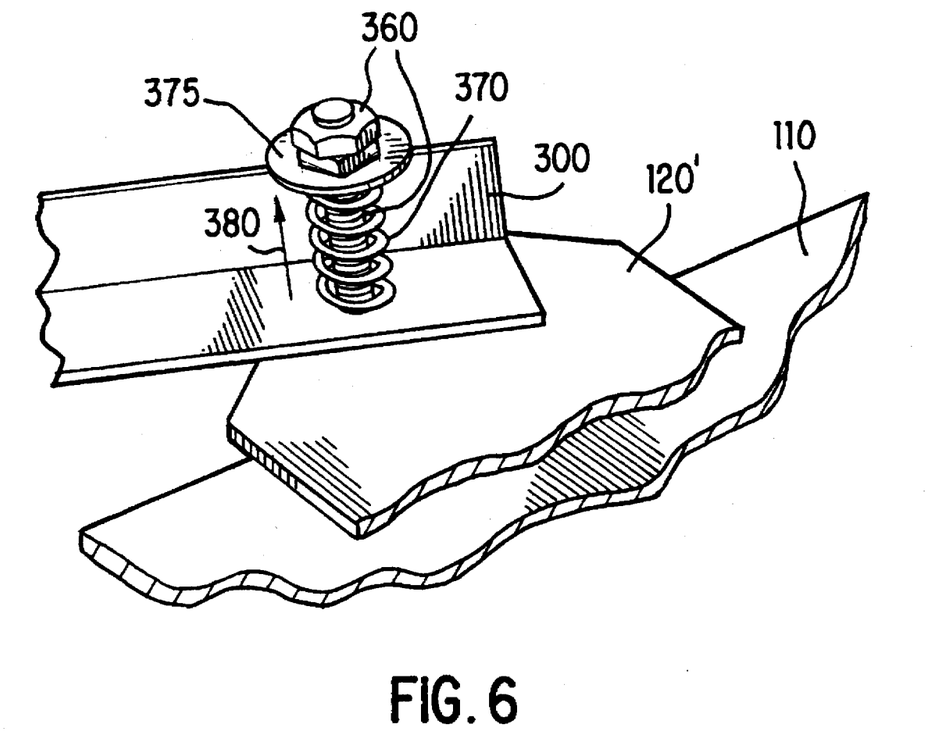

Referring now to FIG. 6, such unevenness of ground elevation may be accommodated by coaxially coupling a bias member 370 and washer 375 at the interface of a fastening member 360 and spacing bar 300 to enable the biased displacement of that portion of spacing bar 300 coupled to supplemental apparatus support extension member 120' along the shaft of fastening member 360, or in a substantially vertical direction, as indicated by directional arrow 380. Bias member 370 is preferably a resilient member, such as a coil spring, which applies a vertical biasing force when captured as shown. A washer 375 may be coaxially coupled to an end of bias member 370 to enhance its axial retention stability. Vertical displacement of outer wheel 340 of machine 30 relative to deck support mechanism 112 is thus enabled for optimal ground tracking.

While it is preferably a separately fabricated member dedicated for the purposes of this invention, deck member 110 may also be the top surface portion of a standard, commercially-available tractor mower deck with which the given ground vehicle 10 may already be equipped. In that case, modification of the mower deck would be necessary to the extent that suitably located through openings are not sufficiently available on its top surface to function as anchoring openings 118, in the formation of one or more anchoring openings 118 on that top surface.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, relative locations of elements may be reversed or interposed, all without departing from the spirit or scope of the invention as defined in the appended Claims.

What is claimed is:

1. A utility expansion system for operably coupling a ground working apparatus to a user-operated ground vehicle comprising:

(a) a deck member coupled to said ground vehicle, said deck member extending substantially in a lateral plane from said ground vehicle and having a top surface for displaceably supporting said ground working apparatus, said deck member being hingedly coupled to said ground vehicle;

(b) deck member support means coupled to said deck member adjacent a distal end thereof for supporting said distal end a predetermined distance above a ground level;

(c) an apparatus support member coupled to said deck member for pivotally supporting said ground working apparatus in spaced relation to said ground vehicles;

(d) apparatus securing means coupled to said ground working apparatus and said apparatus support member for coupling said ground working apparatus to said apparatus support member; and, (e) apparatus manipulation means coupled to said ground working apparatus supported by said apparatus support member, whereby said user may manipulate said ground working apparatus during operation of said ground vehicle.

2. The utility expansion system as recited in claim 1 wherein said apparatus support member includes a longitudinal base section and an extension section extending substantially laterally therefrom for the securing of said ground working apparatus thereto.

3. The utility expansion system as recited in claim 2 wherein said deck member includes support mounting means coupled to said top surface thereof for telescopically receiving at least a portion of said base section of said apparatus support member.

4. The utility expansion system as recited in claim 3 wherein said ground working apparatus is a power weed trimmer, said power weed trimmer being portable and having an elongate shaft portion.

5. The utility expansion system as recited in claim 4 wherein said apparatus securing means includes first and second securing bracket members for capturing said shaft portion of said ground working apparatus therebetween, said first and second securing bracket members being suspended from said extension section of said apparatus support member.

6. The utility expansion system as recited in claim 5 wherein said apparatus manipulation means includes apparatus actuation means for initiating and terminating operation of said ground working equipment.

7. The utility expansion system as recited in claim 6 wherein said apparatus actuation means includes an apparatus actuation lever coupled to a metallic cable, said metallic cable being coupled to said ground working apparatus.

8. The utility expansion system as recited in claim 5 wherein said apparatus manipulation means is releasably secured to said ground working apparatus by the securing thereof to said apparatus securing means.

9. The utility expansion system as recited in claim 1 wherein said ground working apparatus is a walk-behind power weed trimmer.

10. The utility expansion system as recited in claim 9 wherein said utility expansion system includes at least a pair of said apparatus support members, each of said apparatus support members being releasably secured by a fastening means to said deck member and extending substantially along said lateral plane, one of said apparatus support members having a pulley mounted thereon.

11. The utility expansion system as recited in claim 10 wherein said utility expansion system includes a lateral retention cable engaging said pulley of one of said apparatus support members for limiting the lateral displacement of at least a portion of said ground working apparatus, said lateral retention cable having first and second end portions coupled respectively to said apparatus securing means and said ground vehicle.

12. The utility expansion system as recited in claim 11 wherein said fastening means of at least one of said apparatus support members includes a bias member, said bias member resiliently opposing displacement of said apparatus support member from said deck member in a direction substantially normal to said top surface thereof.

13. The utility expansion system as recited in claim 1 wherein said apparatus manipulation means includes a handle member secured to said ground working apparatus.

14. A utility expansion system for operably coupling a ground working apparatus to a user-operated ground vehicle comprising:

(a) a deck member mounted to said ground vehicle, said deck member extending substantially along a lateral plane from said ground vehicle and having a top surface for displaceably supporting said ground working apparatus, said deck member being hingedly coupled to said ground vehicle;

(b) deck member support means coupled to said deck member adjacent a distal end thereof for supporting said distal end a predetermined distance above a ground level;

(c) support mounting means coupled to said top surface of said deck member, said support mounting means having a flange portion and a tubular portion extending substantially normally therefrom;

(d) an apparatus support member pivotally coupled to said support mounting means for supporting said ground working apparatus in spaced relation to said ground vehicle;

(e) apparatus securing means coupled to said ground working apparatus and said apparatus support member for coupling said ground working apparatus to said apparatus support member; and, (f) apparatus manipulation means coupled to said ground working apparatus supported by said apparatus support member, whereby said user may manipulate said ground working apparatus during operation of said ground vehicle.

15. The utility expansion system as recited in claim 14 wherein said utility expansion system includes a stabilization member having an annular portion coupled to said ground vehicle, said annular portion of said stabilization member substantially encircling said tubular portion of said support mounting means for limiting the lateral displacement thereof.

16. The utility expansion system as recited in claim 15 wherein said apparatus support member includes a longitudinal base sections for supporting said extension section, at least a portion of said base section being telescopically received within said tubular portion of said support mounting means.

17. The utility expansion system as recited in claim 16 wherein said apparatus manipulation means includes apparatus actuation means for initiating and terminating operation of said ground working equipment.

18. A utility expansion system for operably coupling a ground working apparatus to a user-operated ground vehicle comprising:

(a) a deck member mounted to said ground vehicle, said deck member extending substantially along a lateral plane from said ground vehicle and having a top surface, said deck member being adapted for displaceably supporting said ground working apparatus, said deck member being hingedly coupled to said ground vehicle;

(b) deck member support means coupled to said deck member adjacent a distal end thereof for supporting said distal end a predetermined distance above a ground level;

(c) support mounting means coupled to said top surface of said deck member, said support mounting means having a flange portion and a tubular portion extending substantially normally therefrom;

(d) an apparatus support member coupled to said deck member for pivotally supporting said ground working apparatus in spaced relation to said ground vehicle;

(e) apparatus securing means coupled to said ground working apparatus and said apparatus support member for coupling said ground working apparatus to said apparatus support member; and, (f) apparatus manipulation means coupled to said ground working apparatus supported by said apparatus support member, whereby said user may manipulate said ground working apparatus during operation of said ground vehicle.

19. The utility expansion system as recited in claim 18 wherein said apparatus manipulation means includes a handle member secured to said ground working apparatus.

20. The utility expansion system as recited in claim 19 wherein said utility expansion system includes at least a pair of said apparatus support members, each of said apparatus support members being releasably secured to said deck member and extending substantially along said lateral plane, one of said apparatus support members having a pulley mounted thereon.

21. The utility expansion system as recited in claim 20 wherein said utility expansion system includes a lateral retention cable engaging said pulley of one of said apparatus support members for limiting the lateral displacement of at least a portion of said ground working apparatus, said lateral retention cable having first and second end portions coupled respectively to said apparatus securing means and said ground vehicle.

* * * * *